US010820234B2

(12) United States Patent
Granier et al.

(10) Patent No.: US 10,820,234 B2
(45) Date of Patent: Oct. 27, 2020

(54) NON-PRIMARY FUNCTIONALITY EXECUTIONS (71) Applicant: Hewlett Packard Enterprise Development LP, Houston, TX (US)

(72) Inventors: Florent Granier, St. Laurent (CA); Eddie Ayotte, Laval (CA); Dominik Seelos, St. Laurent (CA)

(73) Assignee: Hewlett Packard Enterprise Development LP, Houston, TX (US)

(*) Notice: Subject to any disclaimer, the term of this patent is extended or adjusted under 35 U.S.C. 154(b) by 91 days.

(21) Appl. No.: 16/171,615

(22) Filed: Oct. 26, 2018

(65) Prior Publication Data

US 2020/0137629 A1    Apr. 30, 2020

(51) Int. Cl.
*H04W 28/08*  (2009.01)
*H04W 24/08*  (2009.01)
*H04W 16/18*  (2009.01)
*H04W 88/08*  (2009.01)
H04W 84/12   (2009.01)

(52) U.S. Cl.
CPC ........... *H04W 28/08* (2013.01); *H04W 16/18* (2013.01); *H04W 24/08* (2013.01); *H04W 88/08* (2013.01); H04W 84/12 (2013.01)

(58) Field of Classification Search
CPC ..... H04W 16/18; H04W 24/08; H04W 88/08; H04W 28/08
See application file for complete search history.

(56) References Cited

U.S. PATENT DOCUMENTS 9,781,609 B1    10/2017 Kurtz et al.

| 2005/0013316 | A1* | 1/2005 | Liao | H04L 47/14 370/449 |
| 2011/0080886 | A1* | 4/2011 | Chandrachood | H04L 47/14 370/329 |
| 2015/0294308 | A1 | 10/2015 | Pauker et al. | |
| 2017/0039582 | A1 | 2/2017 | Welbourne et al. | |
| 2017/0345230 | A1 | 11/2017 | Bill et al. | |
| 2018/0006808 | A1 | 1/2018 | Suresh et al. | |

OTHER PUBLICATIONS

Balazinska M. et al., Characterizing Mobility and Network Usage in a Corporate Wireless Local-area Network, (Research Paper), Retrieved Jun. 25, 2018, 15 Pgs.

Kanchana N. et al., Mobile Data Mining-using Mobile Device Management System (MDM), (Research Paper), UGC Sponsored National Conference on Advanced Networking and Applications, Mar. 27, 2015, 3 Pgs.

* cited by examiner

*Primary Examiner* — Gbemileke J Onamuti
(74) *Attorney, Agent, or Firm* — Brooks, Cameron & Huebsch, PLLC (57) ABSTRACT An example of a system may include a controller, communicatively connected to an access point (AP), including a processing resource and a memory resource storing instructions executable by the processing resource to: identify an unused portion of a computational capacity of the access point when the access point is executing a primary functionality of the access point; allocate an amount of the unused portion of the computational capacity of the access point to execute a first portion of a non-primary data mining functionality distinct from the primary functionality of the access point; and adjust the amount of the unused portion of the computational capacity allocated to the execution of the non-primary data mining functionality based on a change in network traffic associated with the access point.

20 Claims, 5 Drawing Sheets

NON-PRIMARY FUNCTIONALITY EXECUTIONS

BACKGROUND

Computing networks and constituent network devices are ubiquitous in our homes, offices, and other environments. Network devices may be utilized to provide access to the computing network. Providing and/or expanding access to the computing network may involve a substantial capital investment in network devices.

DETAILED DESCRIPTION

Network devices may be utilized to provide client devices access to resources of the computing network. Client devices are increasingly prevalent in the environment resulting in increased demand for access to the computing network. The cost of purchasing, operating, and/or maintaining network devices to meet this demand may consume capital resources and lock up capital assets in information technology (IT) infrastructure of an enterprise.

In some examples, enterprises may deploy hundreds or even thousands of network devices to provide client devices access to resources of a computing network. The network devices may include processing resources and/or memory resources providing computational capacity to meet the demand of client devices. With increased demand for computing network access, network devices are outfitted with increased processing resources and increased memory resources to meet surges in demand from surges of client device traffic. However, during lulls in demand for network access, such as during non-business hours for an enterprise network, the computational capacity of the network devices is idle. That is, the computational capacity bought and paid for by the network administrator and/or owner is not only sitting unused but has been transformed into a liability in the sense that power and infrastructure support may be consumed by the idle network devices.

To address the idle network devices, prior systems power down network devices and place them in a standby mode to reduce power consumed by the network devices when they are idle. However, placing unutilized network devices in a standby mode to consume less power does not offset the cost involved in purchasing and maintaining the expensive network devices that can meet surges in network demand. Further, prior systems placing unutilized network devices in a standby mode does not address under-utilized computational capacity in network devices.

In contrast, examples of the present disclosure may utilize a system to utilize network devices to execute non-primary functionalities. The system may include a controller communicatively couples to an access point. The controller may include a processing resource and a memory resource. The memory resource may store instructions executable by the processing resource to identify an unused portion of a computational capacity of a network device on a computing network when the network device is executing a primary functionality of the network device; allocate an amount of the unused portion of the computational capacity of the access point to execute a first portion of a non-primary data mining functionality distinct from the primary functionality of the access point; and adjust the amount of the unused portion of the computational capacity allocated to the execution of the non-primary data mining task based on a change in network traffic associated with the access point. By identifying an unused portion of computational capacity and allocating an amount of it to execution of non-primary data mining functionality, examples of the present disclosure may transform the liability of an unutilized or under-utilized network device into a computational asset for the performance of non-primary data mining functionalities without the additional cost associated with acquiring an additional computing hardware to perform the non-primary data mining functionalities.

As used herein, an Access Point (AP) may include a computing device including hardware and/or a combination of hardware and instructions executable by the hardware to operate as a transmitter and/or a receiver of signals between a client device, other access points, a controller, and/or other network devices on the network. In some examples, an AP may act as a transmitter and/or receiver of wireless radio signals for any known or convenient wireless access technology which may later become known. While the term AP may include network devices that transmit and/or receive IEEE 802.11-based Wi-Fi signals, AP is not intended to be limited to IEEE 802.11-based APs.

APs may generally function as an electronic device that is adapted to allow wireless computing devices, such as client devices, to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces and/or 802.15 interfaces, although examples of the disclosure are not limited to such interfaces. An AP can include a memory resource, including read-write memory, and a hierarchy of persistent memory such as ROM, EPROM, and Flash memory.

As described above, the AP may include a computational resource such as a processing resource and/or a memory resource. The AP may utilize its computational resources to perform operations by executing instructions stored on the memory resource. The AP may have a computational capacity. For example, a computational capacity of an AP may be an amount of operations or computations that can be performed by the computational resources of the AP before the computational resources of the AP are fully utilized and their capacity to perform further operations or computations is exhausted or the computational resource have reached a threshold level of utilization.

As used herein, a client device may include a computing device including hardware and/or a combination of hardware and instructions executable by the hardware to access and/or communicate with the network and/or other network devices on the network. For example, a client device may include any data processing equipment such as a computer, laptop, cellular phone, smart phone, personal digital assistant, tablet devices, smart devices, wearable smart devices, smart watch, smart glasses, augmented reality devices, virtual reality devices, etc.

As used herein, a network controller may include a computing device including hardware and/or a combination of hardware and instructions executable by the hardware to manage APs and data transfer among the APs in the network. A controller may include a wireless local area network (WLAN) controller. The WLAN controller may coordinate the operation of and/or communication between APs in the network to mitigate interference between wireless APs, to perform load balancing, to provide fail over redundancy, to retrieve upgrades, and/or to send updates to the APs, etc. In some examples, the APs may connect, via a wired connection and/or wirelessly, to a controller and the controller may connect to a wireless network. In some examples, the controller may be AP-based controllers that are integrated with the AP. The network controller may include a controller that is a distributed and/or a cloud-based network controller.

Figure 1:
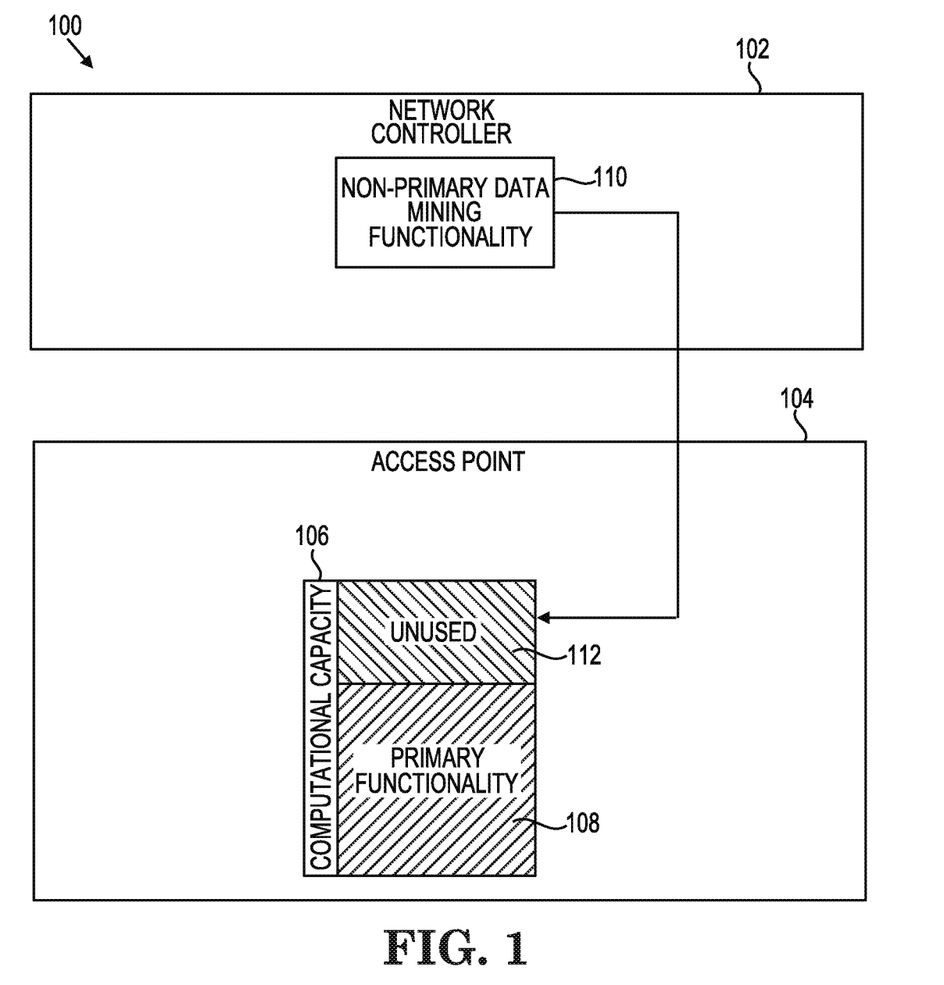
FIG. 1 illustrates an example of a system to execute a non-primary data mining functionality consistent with the disclosure.

FIG. 1 illustrates an example of a system 100 to execute a non-primary data mining functionality. The system 100 is not limited to a particular example described herein and may include additional components and/or functionalities such as those described with regard to the system 214 of FIG. 2, the access point 304 of FIG. 3, the non-transitory machine-readable medium 434 of FIG. 4, and the method 550 described in FIG. 5.

The system 100 may include a network controller 102. The network controller 102 may be communicatively connected to a computing network. For example, the controller may be communicatively connected to a local area network providing network data coverage in and/or around an environment such as home, an office building, a vehicle, an outdoor space, etc.

The network controller 102 may include a wireless local area network (WLAN) controller including hardware and/or a combination of hardware and instructions executable by the hardware to manage APs (e.g., AP 104) communicatively coupled to the network controller 102. For example, the network controller 102 may manage data transfer among APs in the network. A network controller 102 may include a wireless local area network (WLAN) controller. The WLAN controller may coordinate the operation of and/or communication between APs in the network to mitigate interference between wireless APs, to perform load balancing, to provide fail over redundancy, to retrieve upgrades, and/or to send updates to the APs, etc. In some examples, the APs may connect, via a wired connection and/or wirelessly, to a controller and the controller may connect to a wireless network. In some examples, the network controller 102 may be AP-based controllers that are integrated with the AP 102. In some examples, the network controller 102 may be a portion of a distributed controller such as a cloud-based controller.

In some examples, the system 100 may include an access point 104. For example, an AP 104 may be a wireless access point including hardware and/or a combination of hardware and instructions executable by the hardware to provide wireless access to a computing network. For example, the AP 104 may be communicatively coupled to a wired computing network. The AP 104 may be communicatively coupled to a network controller 102 on the computing network. The AP 104 may be managed and/or configured by the network controller 102. The AP 104 may establish and/or maintain a wireless local area network by transmitting and receiving radio signals to wirelessly communicate data to other access points, to a network controller 102, to client devices, etc. The AP 104 may utilize Wi-Fi transceivers, Bluetooth transceivers, Bluetooth Low Energy (BLE) transceivers, ZigBee transceivers, etc. to wirelessly communicate the data.

In some examples, the network controller 102 and/or the AP 104 may include computational resources. For example, the network controller 102 and/or the AP 104 may include a processing resource. The processing resources may be physically located on the network controller 102 and/or the AP 104. The processing resources may be located on another network device communicatively coupled to the network controller 102 and/or the AP 104, but available for utilization by the network controller 102 and/or the AP 104.

In some examples, the processing resource may include a central processing unit (CPU) of the network controller 102 and/or the AP 104. The network controller 102 and/or the AP 104 may also include a memory resource. The memory resource may be utilized to store instructions executable by the processing resource to perform various functionalities.

The computational resources of the network controller 102 and/or the AP 104 may be limited by physics and/or their composition as to the amount of operations that they are able to execute at any given moment. Additionally, the computation resources may be limited by preset thresholds as to the amount of operations that they are able to execute at any given moment.

The amount of operations that the computational resources of the network controller 102 can accommodate may be a computational capacity of the network controller 102. The computational capacity may include a maximum amount of computations and/or a maximum amount of data that the network controller 102 can process in a particular period of time with an entire capacity of the computational resources allotted to the network controller 102 and/or allotted to performing a category of functionalities of the network controller 102.

The network controller 102 may utilize its computational capacity to perform its primary functionality. The primary functionality of the network controller 102 may include the functionality of the network controller 102 that the network controller 102 is designed to perform. That is, the primary functionality of the network controller 102 may include the functionality of the network controller 102 that controls, configures, establishes, provides, and/or maintains access to a computing network.

For example, the primary functionality of the network controller 102 may include the functionalities involved in operating as a controller for a computing network. For example, the primary functionality of a network controller 102 may include the functionalities involved in wirelessly managing access points. The primary functionality of the network controller 102 may include managing and/or implementing the configuration of wireless access points. The primary functionality of the network controller 102 may include functionalities involved in interference detection and avoidance, load balancing, coverage hole detection and correction, radio frequency management, and authentication with 802.1X (Protected Extensible Authentication Protocol (PEAP), LEAP, EAP-TLS, Wi-Fi Protected Access (WPA), 802.11i (WPA2), and/or Layer 2 Tunneling Protocol (L2TP), etc.

Similarly, the amount of operations that the computational resources of the AP 104 can accommodate may be a computational capacity 106 of the AP 104. The computational capacity 106 may include a maximum amount of computations and/or a maximum amount of data that the AP 104 can process in a particular period of time with an entire capacity of the computational resources allotted to the AP 104 and/or allotted to performing a category of functionalities of the AP 104.

The AP 104 may utilize its computational capacity to perform its primary functionality 108. The primary functionality 108 of the AP 104 may include the functionality of the AP 104 that the AP 104 is designed to perform. That is, the primary functionality 108 of the AP 104 may include the functionality of the AP 104 that establishes, provides, and/or maintains access to a computing network.

For example, a primary functionality 108 of an AP 104 may include the functionalities involved in operating as an AP 104 for a computing network. For example, the primary functionality 108 of an AP 104 may include the functionalities involved in creating a wireless local area network by wirelessly communicating with client devices, other access points, network controllers, and/or other network devices. The primary functionality 108 of an AP 104 may include utilizing wireless radio signals to communicate data frames with client devices, other access points, network controllers, and/or other network devices. The primary functionality 108 of the AP 104 may include detecting and/or responding to probe requests, authenticating client devices, associating client devices to the computing network, and/or acting as a data communication bridge between associated client device and other network devices.

The network controller 102 may identify an unused portion 112 of the computational capacity 106 of the AP 104. Determining the unused portion 112 of the computational capacity 106 of an AP 104 may include determining a portion of the computational capacity 106 of the AP 104 that is idle or is otherwise not being utilized during the execution of the primary functionality 108 of the AP 104.

The unused portion 112 of the computational capacity 106 of the AP 104 remaining when the network device is executing its primary functionality 108 may be determined by monitoring computational capacity 106 utilization metrics generated by the AP 104 and reported to the network controller 102. Various metrics may be utilized to monitor and/or determine computational capacity 106 utilization at an AP 104. In an example, the computation capacity 106 being utilized and/or reserved for utilization to execute primary functionalities 108 may be determined based on analysis of network traffic on the computing network that the network controller 102 is connected to. That is, the amount of clients, the amount of data communication, and/or the type of data communication occurring on a computing network may be utilized to determine an amount of computational capacity 106 that is being utilized and/or left unused at each of a plurality of APs 104 communicatively coupled to the network controller 102.

In another example, unused portion 112 of the computational capacity 106 of the AP 104 remaining when the network device is executing its primary functionality 108 may be determined may be based on central processing unit (CPU) utilization metrics. For example, the CPU utilization percentage for an AP 104 may be reported by and/or determined from the AP 104 at the time that the AP 104 is executing its primary functionality 108. For example, the CPU utilization metric may be determined and/or reported at the time that the AP 104 is providing wireless network access to and/or data communication with associated client devices. The CPU utilization metric may be indicative of a remaining or unused portion 112 of the computational capacity 106 of the AP 104 while the AP 104 is providing unrestricted execution of the primary functionality 108 wherein any demands (e.g., client traffic, other data traffic, network management tasks, network communication, establishing network access, maintaining network access, providing network access, etc.) for the primary functionality 108 is being granted impinged access to as much of the computational capacity 106 as it involves or requests without restriction.

For example, the AP 104 may be at seventy percent CPU utilization while executing its primary functionality 108. That is, execution of the primary functionality 108 of providing wireless computing network access to client devices may be consuming seventy percent of the computational capacity 106 of the AP 104. As such, the seventy percent CPU utilization may be subtracted from a hundred percent of the computational capacity 106 attributed to the AP 104. Accordingly, thirty percent of the computational capacity 106 may be identified as an unused portion 112 of the computational capacity 106 of the AP 104.

In other examples, additional considerations may weigh in on the identification of the unused 112 portion of the computational capacity 106 of the AP 104. For example, a total amount or percentage of the computational capacity 106 that may be consumed by execution of non-primary functionalities (e.g., non-primary data mining functionality 110) and/or consumed by the combination of executing non-primary functionalities and primary functionalities 108 may be capped. For example, a determination may be made that twenty percent of the computational capacity 106 should be held in reserve at specific times (e.g., during business hours) or all the time to accommodate increases or bursts in client device access demands, resulting in an eighty percent capped total amount of computational capacity 106 able to be utilized to execute non-primary functionalities (e.g., non-primary data mining functionality 110) and/or to execute non-primary functionalities and primary functionalities 108 simultaneously. In such examples, AP 104 may be determined to have ten percent of the computational capacity 106 as a unused portion 112. Therefore, despite thirty percent of the total computational capacity 106 not being used, due to the twenty percent reserve cap only ten percent may be identified as the unused portion 112 available for use in executing a non-primary functionality in order to keep the twenty percent computational capacity 106 in reserve to accommodate increased demand for primary functionality 108 executions.

As described above, the network controller 102 may include a computational capacity and a portion of its computational capacity may be unutilized by the execution of the primary functionalities of the network controller 102. That unutilized portion of the computational capacity of the network controller 102 may be utilized to receive, execute, and/or distribute portions of a non-primary data mining functionality 110. A non-primary data mining functionality 108 may include a functionality that is functionally distinct from the primary functionality of the network controller 102 and/or the primary functionality 108 of the AP 104. The non-primary data mining functionality 110 may include functionalities involved in data mining tasks on data sets that are unrelated to and/or distinct from data associated with the primary functionality 108 of the AP 104 and/or the primary functionality of the network controller 102. For example, the non-primary data mining functionality 110 may include functionalities involved in processing, transforming, and/or discovering patterns in data sets distinct from data associated with the primary functionality 108 of the AP 104 and/or the primary functionality of the network controller 102. For example, a non-primary data mining functionality 110 may include analysis of business data to identify and analyze patterns and/or generate predictions regarding strategic business information of an enterprise. A non-primary data mining functionality 110 may include monitoring sensor data to identify and analyze patterns and/or to generate predictions regarding phenomena being detected by sensors. A non-primary data mining functionality 110 may include processing images to train a computer vision model and/or processing images by identifying objects or patterns in the images utilizing computer vision and/or object detection. A non-primary data mining functionality 110 may include training an artificial intelligence and/or machine learning system with data sets and/or patterns recognized therein. A non-primary data mining functionality 110 may include analyzing surveillance data such as surveillance video footage and/or location tracking logs to perform surveillance and/or crime prevention/detection. A non-primary data mining functionality 110 may include analyzing and/or generating computer models such as of three dimensional objects to determine spatial qualities of the object. A non-primary data mining functionality 110 may include a cryptocurrency mining task. In an example, the non-primary data mining functionalities 110 may include functionalities involved in ensuring the authenticity of information by solving mathematical problems utilizing a block containing cryptocurrency transactional data and updating a blockchain digital ledger to reflect the results.

The non-primary data mining functionality 110 may be a file, such as a configuration file, received as an input at the network controller 102. For example, the input data and/or a specification of the non-primary data mining functionalities involved in a data mining task may be included in a file taken as a parameter at the network controller 102. As described above, the network controller 102 may be utilizing a portion of its own computational capacity that is unused when executing its primary functionality to execute a portion of the non-primary data mining functionalities 110. Regardless of whether execution of any of the non-primary data mining functionalities 110 are being executed by the network controller 102, the network controller 102 may parcel out portions of the data computation non-primary data mining functionalities 110 remaining to be executed to complete a particular data mining task to APs such as AP 104. In this manner, a network controller 102 may operate a farm of APs 104 to farm out portions of non-primary data mining functionalities 110 to. In some examples, when execution of the file on the network controller 102 is stopped then the execution of the non-primary functionalities 110 distributed to APs may be also be ceased.

As described above, the network controller 102 may be utilized to receive, execute, and/or distribute portions of a non-primary data mining functionality 110 with an unused portion of its computational capacity. The reception, execution, and/or distribution of the non-primary data mining functionality 110 may be assigned a relatively lower execution priority than an execution priority of the primary functionality of the network controller 102. In this manner, the execution of the primary functionality of the network controller 102 may be given a priority or precedence over the reception, execution, and/or distribution of the non-primary data mining functionality 110 by the network controller 102. In this manner, the execution of the primary functionality of the network controller 102 may not be deprived of access to as much of the computational capacity of the network controller 102 as it needs in order to complete executions of the primary functionality as expeditiously as possible.

As described above, the network controller 102 may allocate a portion of the computational capacity 106 of the access point 104 to execute a portion of the non-primary data mining functionality 110 that is distinct from the primary functionality 108 of the access point 104. As described with respect to the network controller 102, the execution of the non-primary data mining functionality 110 may be assigned a relatively lower execution priority than an execution priority of the primary functionality 108 of the access point 104 with respect to access to the computational capacity 106 of the AP 104. That is, the execution of the primary functionality 108 of the AP 104 may be given a priority or precedence over the execution of the portion of the non-primary data mining functionality 110 to be executed utilizing the computational capacity 106 of the AP 104. In this manner, the execution of the primary functionality 108 of the AP 106 may not be deprived of access to as much of the computational capacity 106 of the AP 104 as it needs in order to complete executions of the primary functionality 108 as expeditiously as possible.

The network controller may allocate portions of the computational capacity 106 of various APs 104 to execute the non-primary data mining functionality 110 based on the identification of the unused portion 112 of the computational capacity 106 of each AP 104. That is, the network controller 102 may allocate an amount of the identified unused portion 112 of the computational capacity 106 of the AP 104 to the execution of a portion of the non-primary data mining task 110.

The amount of the identified unused portion 112 of the computational capacity 106 of the AP 104 to be allocated may be determined based on the properties non-primary data mining functionality 110 and/or the parameters or limits associated with utilizations of the computational capacity 106 for a particular AP 104 at a particular time.

For example, execution of the portion of the non-primary data mining functionality 110 may be completed utilizing five percent of a computational capacity 106. Whereas the identified unused portion 112 of the computational capacity 106 includes thirty percent of the computational capacity 106. In such examples, an amount of the unused portion 112 of the computational capacity 160 equal to five percent of the computational capacity 106 may be allocated to execution of the portion of the non-primary data mining functionality 110.

In other examples, execution of the portion of the non-primary data mining functionality 110 may be completed utilizing thirty percent of the computational capacity 106 of the AP 104. In such examples, the unused portion 112 of the computational capacity 106 may be equal to twenty percent of the computational capacity 106 of the AP 104. In such examples, an amount of the unused portion 112 of the computational capacity 160 equal to twenty percent of the computational capacity 106 may be allocated to execution of the portion of the non-primary data mining functionality 110.

In further examples, execution of the portion of the non-primary data mining functionality 110 may be completed utilizing thirty percent of the computational capacity 106 of the AP 104 and the unused portion 112 of the computational capacity 106 in such examples may be equal to thirty percent of the computational capacity 106 of the AP 104. In such examples, the overall amount of the computational capacity 106 that may be utilized at a given time to execute at least the portion of the non-primary data mining functionality 110 may be capped at ninety percent of the computational capacity 106 of the AP 104. In such examples, an amount of the unused portion 112 of the computational capacity 160 equal to twenty percent of the computational capacity 106 may be allocated to execution of the portion of the non-primary data mining functionality 110.

The network controller 102 may continually and/or periodically monitor utilization of the computational capacity 106 of the access point 104 to determine a used portion 112 of the computational capacity 106 and/or a portion of the computational capacity consumed by executing the primary functionality 108 at each AP 104 of a plurality of APs providing computing network access. As such, a network controller 102 may be continuously aware of unused computational capacity on the plurality of APs in a network that may be available for allocation to executing non-primary data mining functionalities 110. Additionally, the network controller 102 may recognize and responds to changes in computational capacity utilization and/or primary functionality 108 demands across a plurality of APs under its control.

The network controller 102 may adjust the amount of the unused portion 112 of the computational capacity 106 allocated to the execution of the non-primary data mining functionality 110 based changes to the utilization of the computational capacity 106 at an AP 104 For example, the amount of the unused portion 112 of the computational capacity 106 allocated to the execution of the non-primary data mining functionality 110 based on a change in network traffic associated with the access point 104, which may result in changed demands for computational capacity 106 to execute the primary functionality 108 of the AP 104 with regard to the changed network traffic conditions. For example, if an increased amount of client devices associated to the AP 104 or the client devices already associated to an AP 104 begin to request access to more data intensive services via the AP 104, then the amount of the computational capacity 106 of the AP 104 dedicated to executing the primary functionalities 108 may be increased to meet these demands. In such examples, the network controller 102 may decrease the amount of the unused portion 112 that is allocated to execution of the non-primary data mining functionality 110 to free up the computational capacity 106 to meet the increased demand for execution of the primary functionalities 108.

The network controller 102 may reduce the amount of the unused portion 112 allocated to executing the non-primary data mining functionality 110 by an amount that satisfies the increased demand for execution of the primary functionalities 108 while also honoring the overall cap placed on computational capacity 106 utilization. For example, when a computational capacity 106 of the AP 104 is fully utilized (e.g., either by maxing out the ability of the computational resources to perform additional simultaneous operations or by utilizing the computational resources up to the capped total amount of computational capacity 106 that may be utilized while holding a specified amount in reserve) and at least a portion of that utilized computational capacity 106 is being utilized to execute a portion of the non-primary data mining functionality 110, the aforementioned execution prioritization may come into consideration. For example, when additional computational capacity is requested to execute primary functionalities 108 of the AP 104 then the primary functionalities 108 may be given precedence over the portion of the non-primary data mining functionalities 110. As a result, the amount of the computational capacity 106 allocated to executing the portion of the non-primary data mining functionality 110 may be reduced and/or reallocated to executing the primary functionality 108.

Likewise, when the execution of the non-primary data mining functionality 110 has been completed (e.g., the data mining task or portion thereof has been completed and/or a final output has been generated) the portion of the computational capacity 106 of the AP 104 allocated to the execution of the portion of the non-primary data mining functionality 110 may be reallocated to execution of the higher priority primary functionality 108 of the AP 104. This reallocation to the primary functionality 108 of the AP 104 may occur in response to completion of the execution of the non-primary data mining functionality 110 even in the absence of a demand for additional computational capacity 106 to execute the primary functionality 108 at the AP 104. That is, allocation of computational capacity 106 may have a default allocation to execution of the primary functionality 108 of the AP 104 in the absence of an active allocation of a portion of a non-primary data mining functionality 110 form the controller 102.

In this manner, the system 100 may transform the unutilized or under-utilized computational capacity of the network controller 102 and/or the unutilized or under-utilized computational capacity 106 of the AP 104 into a computational asset for data mining functionalities. Performance of the data mining functionalities may operate to offset the capital expenditure undertaken to purchase and/or maintain the network controller 102 and/or the AP 104. For example, cryptocurrency mining non-primary data mining functionalities 110 may eventually entirely pay for the network controller 102 and/or the AP 104 and/or generate additional streams of revenue for an enterprise.

Figure 2:
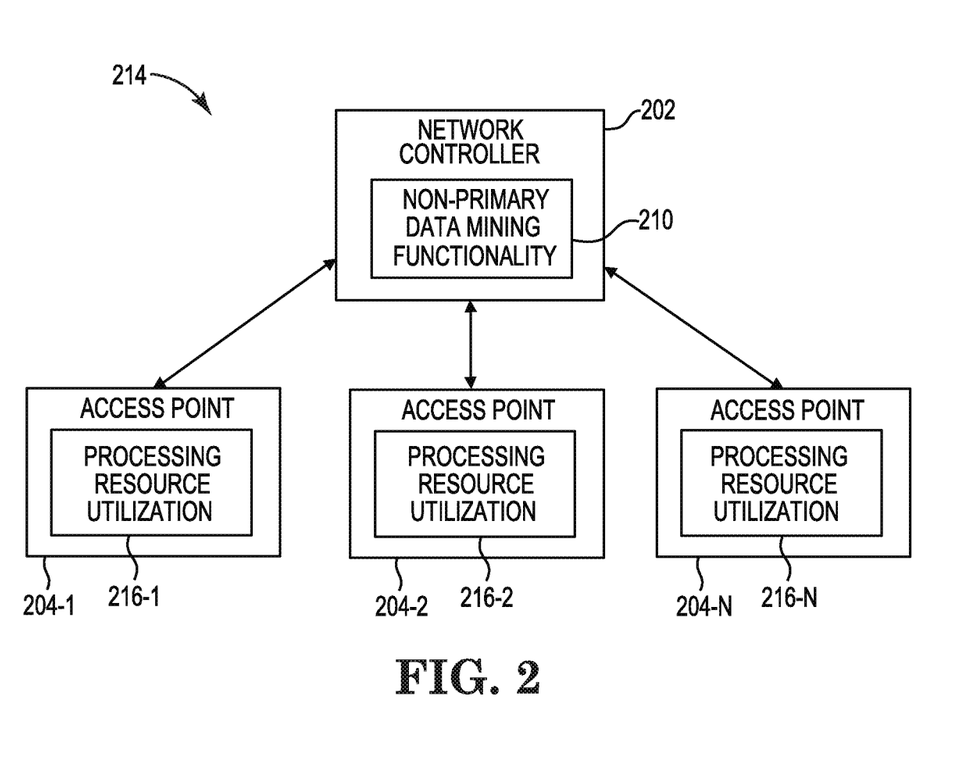
FIG. 2 illustrates an example of a system to execute a non-primary data mining functionality consistent with the disclosure.

FIG. 2 illustrates an example of a system 214 to execute a non-primary data mining functionality. The system 214 is not limited to a particular example described herein and may include additional components and/or functionalities such as those described with regard to the system 100, the access point 304 of FIG. 3, the non-transitory machine-readable medium 434 of FIG. 4, and the method 550 described in FIG. 5.

The system 214 may include a network controller 202. The network controller 210 may include a standalone physically separate network appliance. Alternatively, the network controller 210 may be integrated in to other network devices such as access points 204-1 . . . 204-N. The network controller 202 may be a master controller over a cluster of controllers. The network controller 202 may include a virtual controller and/or may be distributed over a plurality of network devices. The network controller 210 may be managing a plurality of APs 204-1 . . . 204-N.

The network controller 202 may monitor the unused portion of the computational capacity of each access point of the plurality of APs 204-1 . . . 204-N connected to a computing network when the APs 204-1 . . . 204-N are executing their respective primary functionalities. The network controller 202 may identify the unused portion of the computational capacity of each access point of the plurality of APs 204-1 . . . 204-N on the computing network based on a CPU utilization metric 216-1 . . . 216-N. The CPU utilization metric 216-1 . . . 216-N may be provided to the network controller 202 from each of the APs 204-1 . . . 204-N concurrent with their execution of their respective primary functionalities. Additionally, the network controller 202 may be aware of the status (e.g., offline, online, standby, etc.) of each the plurality of APs 204-1 . . . 204-N.

The network controller 202 may accept a file, such as a configuration file, as an input. For example, the input file may include the input data set and/or the non-primary data mining functionalities 210 involved in a data mining task. The file may be taken as a parameter at the network controller 202. The network controller 202 may utilize a portion of its own computational capacity, not being used when the network controller 202 is executing its primary functionality, to execute a portion of the non-primary data mining functionality 210.

The network controller 202 may parcel out the remaining unexecuted non-primary data mining functionalities 210 to the APs 204-1 ... 204-N to be executed. The network controller 202 may determine an amount of an unused portion of the computational capacity of each of the APs 204-1 ... 204-N to be allocated to an execution of a portion of the non-primary data mining task 210. The amount of the unused portion of the computational capacity of each of the APs 204-1 ... 204-N to be allocated to the execution of the portion of the non-primary data mining task 210 may be determined based on computing network traffic corresponding to each of the APs. As such, the unused portions of the computational capacity of each AP of the plurality of APs 204-1 ... 204-N being managed by a network controller 202 may be allocated to execute a portion of the non-primary data mining functionality 210 while preserving enough computational capacity to meet the demands imposed on each AP by its computing network traffic load.

As described above, the execution of the non-primary data mining functionalities 210 may be assigned a lower priority than the execution of primary functionalities at the network controller 202 and/or the APs 214-1 ... 214-N. As such, handling of network traffic, unrelated to the non-primary data mining functionalities 210, may retain prioritized and uninterrupted access to the computing resources of the APs 204-1 ... 204-N and the computing resources of the network controller 202 while still accomplishing execution of the non-primary data mining functionalities 210 with the unutilized or under-utilized computational capacity that may occasionally occur in computing networks.

As a result of its management role, the network controller 202 may have access to information about the various APs 204-1 ... 204-N that are recognized and/or managed by the network controller 202. As a result, the addition of new APs to the computing network may be accomplished seamlessly. That is, when a new or previously unrecognized AP is added to the plurality of APs 204-1 ... 204-N communicatively coupled to the network controller 202 and/or the computing network, the network controller 202 may, without manual intervention or configuration, begin receiving information, such as CPU utilization, from the new AP. This information may be utilized to integrate the new AP into the plurality of APs 204-1 ... 204-N accessible to the network controller 202 to allocation execution of non-primary data mining functionalities 210 to As such, the unused computational capacity of a new AP may be immediately identified and made available for executing non-primary data mining functionalities 210. In some examples, the plurality of APs 204-1 ... 204-N may be treated as a computational farm by the network controller 202, whereby computational capacity not utilized in performing the primary functionalities of the plurality of APs 204-1 ... 204-N may be farmed out to execute the non-primary data mining functionalities 210 specified by the network controller 202.

Figure 3:
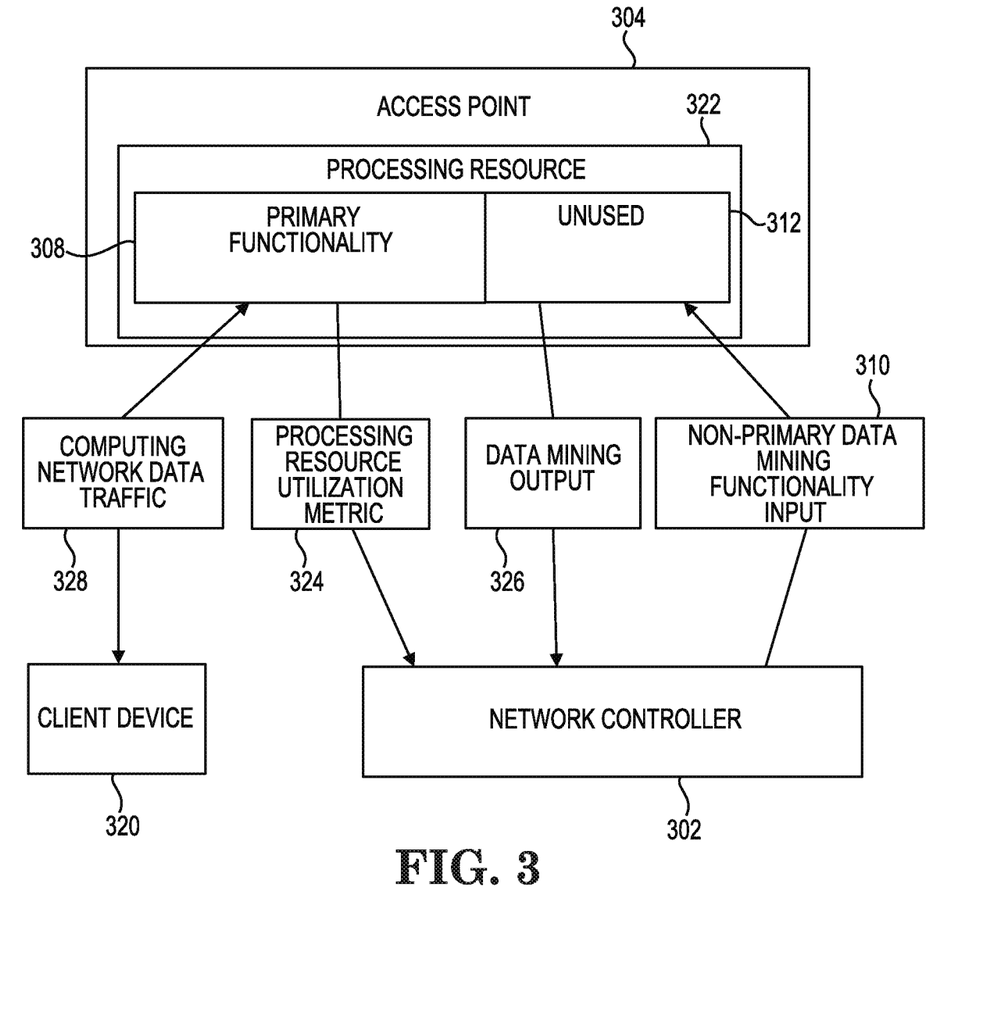
FIG. 3 illustrates an access point to execute a non-primary data mining functionality consistent with the disclosure.

FIG. 3 illustrates an access point 304 to execute a non-primary data mining functionality. The access point 304 is not limited to a particular example described herein and may include additional components and/or functionalities such as those described with regard to the system 100 described in FIG. 1, the system 214 of FIG. 2, the non-transitory machine-readable medium 434 of FIG. 4, and the method 550 described in FIG. 5.

The access point 318 may be communicatively coupled to a computing network, a network controller 302, and/or a client device 320. The access point 318 may communicate data with client devices 320, other access points, network controllers 302, and/or other network devices using wireless radio communication and/or a wired connection such as through a wired Ethernet port.

The access point 304 may include a processing resource 322. The access point 304 may include a memory resource. For example, the access point 304 may include a non-transitory machine-readable medium storing instructions executable by the processing resource 322 to execute functionalities such as primary functionalities 308 or non-primary data mining functionalities 310. For example, the processing resource 322 may execute primary functionalities 308 involved in creation of a wireless local area network in an environment such as a home, office building, vehicle, outdoor space, etc. The access point 304 may be connected to a wired router, switch, or hub via a cabled (e.g., Ethernet cable) connection and may execute functionalities involved in projecting signals such as Wi-Fi, BLE, Bluetooth, ZigBee, etc. to designated areas within the environment.

The processing resource 322 of the access point 304 may have a specific capacity (e.g., the capacity represented by the combination of the primary functionality block 308 and the unused block 312). For example, the processing resource 322 may be able to execute a specific amount of operations simultaneously. The processing resource 322 may be restricted (e.g., by a preset threshold, material limitations, limitations of physics, etc.) to executing no more that the specific amount of operations simultaneously. The specific amount of operations that the processing resource 322 is capable of executing may be referred to as the computational capacity of the access point 304.

The access point 304 may monitor a processing resource utilization metric 324. For example, a portion of the primary functionality 308 executed by the processing resource 322 may include monitoring the utilization of the processing resource 322 and/or an unused portion 312 of the processing resource 312 and determining a processing resource utilization metric 324. The processing resource utilization metric 324 may include a metric communicating a status of the access point 304, a status of the processing resource 322, a percentage or other quantification of the portion of the capacity of the processing resource 322 being utilized by execution of the primary functionality 308, a percentage or other quantification of the portion of the capacity of the processing resource 322 consumed by execution of any non-primary functionality, and/or a percentage or other quantification of the portion of the unused capacity 312 of the processing resource 322. In some examples, the processing resource utilization metric 324 may also include information regarding the amount of client devices 320 associated to the access point 304 and/or information regarding the type or amount of computing data traffic 328, unrelated to any non-primary data mining functionality, that the AP 304 is experiencing. The processing resource utilization metric 324 may be communicated from the access point 304 to a network controller 302. For example, a portion of the primary functionality 308 executed by the processing resource 322 may include communicating processing resource utilization metrics 324 to the network controller 302.

The processing resource utilization metric 324 may be utilized to identify an unused portion 312 of a computational capacity of the processing resource 322 of an AP 304 connected to a computing network while the AP 304 is executing a primary functionality 308. A portion of the unused capacity 312 of the processing resource 322 may be allocated to execution of a non-primary data mining functionality. For example, based on computing network data traffic 328 being handled by the AP 304 and/or predicted to be handled by the AP 304 over a current or future time period, an amount of the unused capacity 312 of the processing resource 322 may be allocated to processing a non-primary data mining functionality input 310. The amount of the unused capacity 312 of the processing resource 322 may be allocated to execute a data mining operation on a data set provided in the non-primary data mining functionality input 310. The non-primary data mining functionality input may be received at the AP 304 from the network controller 302 and it may be processed utilizing the unused capacity 312 of the processing resource 322 of the AP 304 to produce a data mining output 326. The data mining output 326 may include the mined data, transformed data, and/or data patterns resulting from the execution of the data mining operation on the non-primary data mining functionality input 310 by the unused capacity 312 of the access point 304. The data mining output 326 may be communicated back to the network controller 302 whence the non-primary data mining functionality input 310 was communicated and/or some other network device.

As network conditions vary (e.g., the amount of client devices 320 associated to the AP 304 changes, the volume or type of computing network data traffic 328 handled by the AP 304, etc.), the load imposed on the processing resource 322 of the access point 304 to execute all the requested operations of the primary functionality 308 may vary in a corresponding manner. With such variations, the amount of computational capacity of the processing resource 322 allocated to execution of data mining operations on the non-primary data mining functionality input 310 may be adjusted such that the execution of primary functionalities 308 receive preferential and/or uninterrupted access to as much of the computational capacity of the processing resource 322 as they request to consume.

Figure 4:
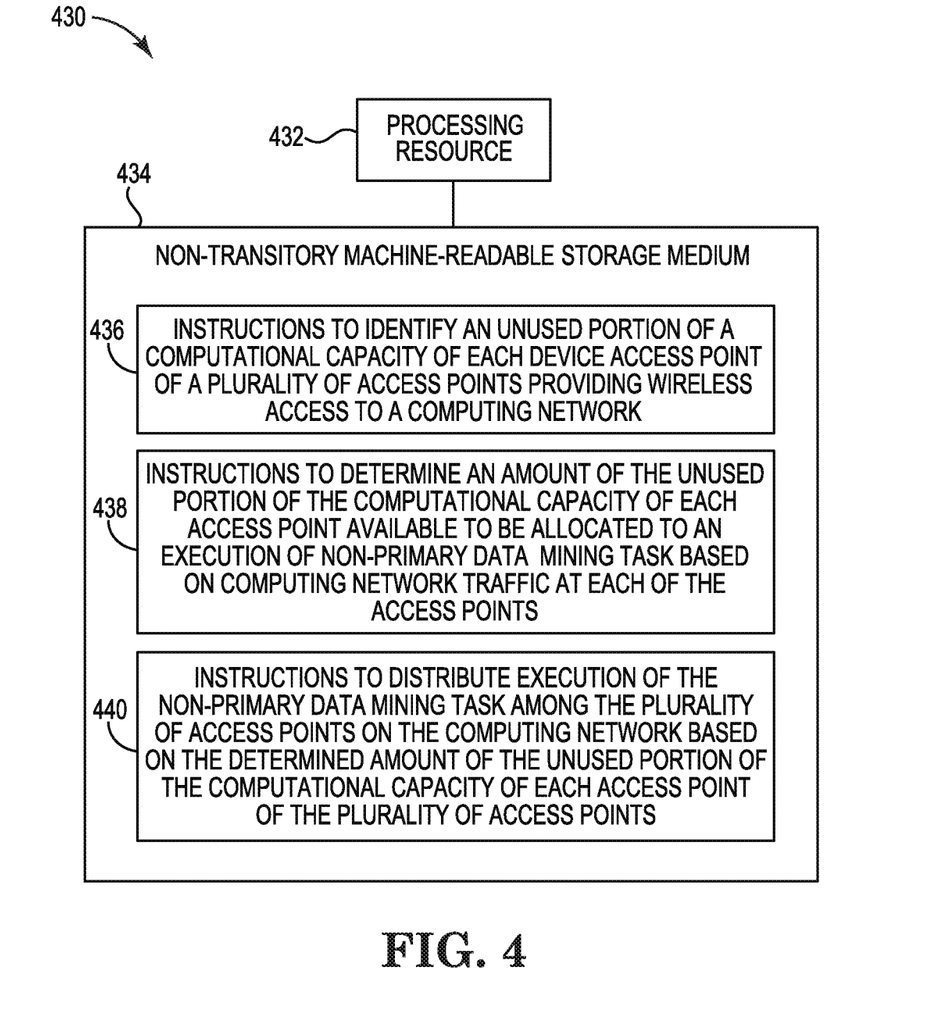
FIG. 4 illustrates a diagram of a processing resource and a non-transitory machine-readable medium to execute a non-primary data mining functionality consistent with the disclosure.

FIG. 4 illustrates a diagram 430 of a processing resource 432 and a non-transitory machine-readable medium 434 to execute a non-primary data mining functionality. A memory resource, such as the non-transitory machine-readable medium 434, may be used to store instructions (e.g., 436, 438, 440, etc.) executed by the processing resource 432 to perform the operations as described herein. The operations are not limited to a particular example described herein and may include additional operations such as those described with regard to the non-transitory machine-readable medium 434 is not limited to a particular example described herein and may include additional components and/or functionalities such as those described with regard to the system 214 of FIG. 2, the access point 304 of FIG. 3, and the method 550 described in FIG. 5.

A processing resource 432 may execute the instructions stored on the non-transitory machine-readable medium 434. The non-transitory machine-readable medium 434 may be any type of volatile or non-volatile memory or storage, such as random-access memory (RAM), flash memory, read-only memory (ROM), storage volumes, a hard disk, or a combination thereof.

The machine-readable medium 434 may store instructions 436 executable by the processing resource 432 to identify an unused portion of a computational capacity of each AP of a plurality of access points providing wireless access to a computing network. Each AP may monitor and/or report computational resource utilization for its central processing resource. For example, Each AP may monitor and report a central processing resource utilization metric as it executes its primary functionalities.

The central processing resource utilization metric may be utilized to identify the unused portion of the computational capacity of each AP of the plurality of APs. For example, the central processing resource utilization metric for a given AP may be subtracted from a total computational capacity for the central processing resource of the AP in order to determine an amount of the total computational capacity that is not being utilized by the execution of the primary functionality for that AP.

In some examples, an amount of the total computational capacity of the central processing resource for each AP may be reserved. For example, a percentage of the total computational capacity of the central processing resource may be earmarked as an additional capacity to remain available to execute the APs primary functionality in instances where the total computational capacity is not fully utilized by executing the primary functionalities. In an example, ten percent of the total computational capacity may be earmarked as a reserve capacity for executing a primary functionality of the AP, such that even when up to ten percent of the total computational capacity is not being utilized for executing the primary functionalities of the AP it will not be permitted to be allocated to executing any non-primary functionalities. As such each AP may include reserved computational capacity to ensure that residual processing capacity exists in the network device during specific times to respond to surges in network traffic without delaying or otherwise degrading execution of the primary functionalities. In such examples, the central processing resource utilization metric for a given AP may be subtracted from the total computational capacity for a central processing resource that is not being utilized by the execution of the primary functionality of the AP minus the reserve amount to identify at an unused portion of the computational capacity of the network device available to be allocated to non-primary data mining functionalities.

The machine-readable medium 434 may store instructions 438 executable by the processing resource 432 to determine an amount of the unused portion of the computational capacity of each access point available to be allocated to an execution of a non-primary data mining task based on the computing network traffic at each of the access points. For example, an amount of clients associated to an AP, an amount of data traffic at an AP, a type of data traffic at an AP, the computational load that traffic is placing on the central processing resource, etc. may be utilized to determine an amount of the unutilized computational capacity of the central processing resource that can be repurposed to non-primary data mining functionalities without negatively impacting the primary functionality of the AP and/or user experience of a client device associate to the AP. In some examples, the entire unused amount of the computational capacity may be determined to be eligible to be reallocated. In some examples, less than the entire unused amount of the computational capacity may be determined to be eligible to be reallocated.

The machine-readable medium 434 may store instructions 440 executable by the processing resource 432 to distribute execution of a non-primary data mining functionality among the plurality of APs on the computing network. The execution of the non-primary functionality may be distributed among the plurality of APs based on the determined amount of the unused portion of the computational capacity of each AP of the plurality of APs.

The non-primary data mining functionality may be determined from a configuration file executed from a network controller that is managing the plurality of APs on the computing network. For example, a configuration file with data mining input data and/or instructions to computationally transform the data mining input data may be communicated to an AP from a network controller that is managing the AP. In an example, the non-primary data mining functionality may include a cryptocurrency mining task. In such examples, the data mining input data of a cryptocurrency transaction log along with instructions to authenticate the transaction and/or to calculate an update to a blockchain may be passed from a network controller to an AP to be executed as a non-primary data mining functionality utilizing the determined amount of the unused computational capacity of the AP.

The amount of the computational capacity requested to execute primary functionalities of the AP may fluctuate as the amount of traffic, type of traffic, and/or other network occurrences fluctuate. Accordingly, the amount of unused computational capacity at the AP may fluctuate. As such, the amount of the computational capacity allocated to executing primary functionalities and/or the amount of the computational capacity allocated to executing non-primary data mining functionalities may not be static. Instead, the amount of the computational capacity allocated to executing primary functionalities and/or the amount of the computational capacity allocated to non-primary data mining functionalities may be adjusted based on the fluctuations described above. For example, an increase or a decrease in the amount or type of computing network traffic utilizing at least one of the APs of the plurality of APs may trigger a corresponding increase or decrease in the amount of the computational capacity of at least one of the APs reserved for executing primary functionalities of the AP. If the amount of unused computation capacity goes up, then more of the unused computational capacity may be allocated to executing non-primary data mining functionalities. Conversely, if the execution of additional primary functionalities is requested or forecasted, computational capacity may be reallocated from the execution of non-primary data mining functionalities back to the execution of primary functionalities of the AP.

Additionally, fluctuations across the unused computational capacity across the plurality of APs may result in adjustments in the distribution of execution of non-primary data mining functionalities among the plurality of APs. For example, the execution of a portion of the non-primary data mining functionality may be redistributed from a first AP to a second AP in response to changes in the amount of the unused portion of the computational capacity at the first AP and/or at the second AP. For example, a network controller may perform load balancing of the execution of the non-primary data mining functionality across the plurality of APs based on the unused computational capacity and/or computing network traffic at each of the APs.

Figure 5:
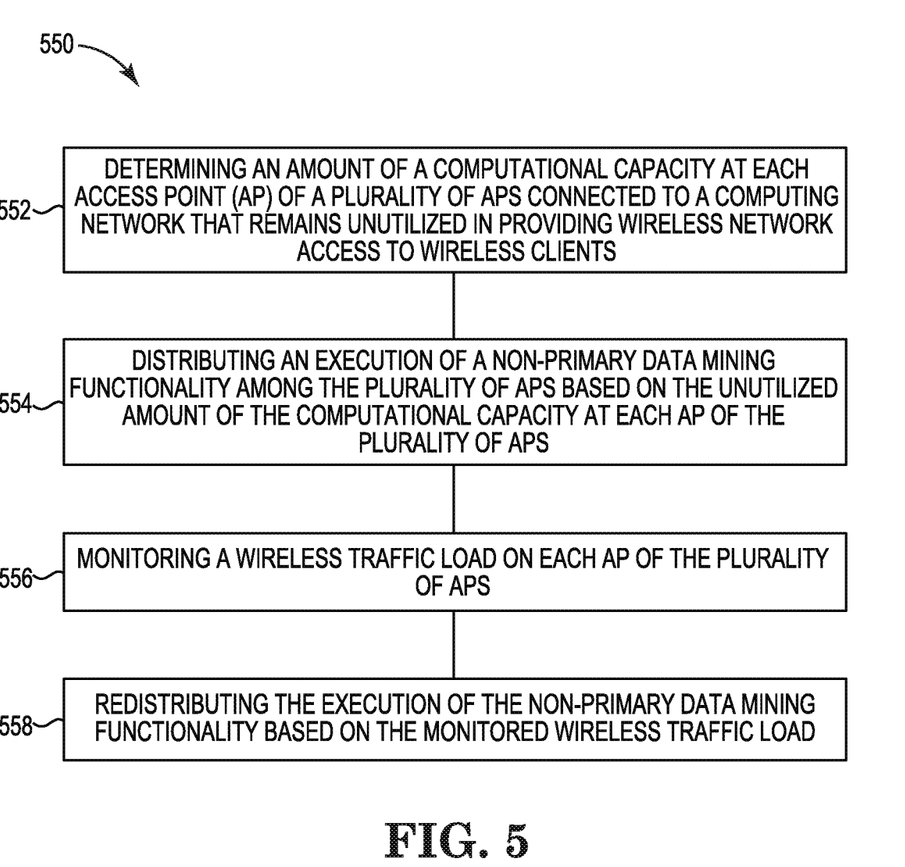
FIG. 5 illustrates a diagram of a method to execute a non-primary data mining functionality consistent with the disclosure.

FIG. 5 illustrates a diagram of a method to execute a non-primary data mining functionality. The method 550 is not limited to a particular example described herein and may include additional components and/or functionalities such as those described with regard to the system 100 of FIG. 1, the system 214 of FIG. 2, the access point 304 of FIG. 3, and the non-transitory machine-readable medium 434 of FIG. 4.

At 552, the method 550 may include determining an amount of a computational capacity at each AP of a plurality of APs connected to a computing network that remains unutilized by the AP in providing wireless network access to associated wireless clients. As described above, the amount of the computational capacity that is utilized or unutilized in providing wireless network access to associated wireless clients may be determined based on utilization statistics and/or usage metrics communicated from the AP. In an example, an AP may determine, monitor, and/or report a computational resource utilization metric such as a CPU utilization metric concurrent with execution of all current requested primary functionalities of the AP by the CPU. In this manner a substantially real-time estimate of the computational capacity utilization and/or unused computational capacity for each AP on a computing network may be determined.

Determining the unutilized computational capacity may also include determining an amount of the unutilized computational capacity of each access point of the plurality of access points to reserve. The amount may be reserved to provide additional wireless network access to wireless clients for the APs. The amount to be reserved may be determined based on a schedule corresponding to historical wireless traffic loads on the computing network. That is, historical traffic patterns may be utilized to predict traffic bursts at certain hours and/or on certain days. These patterns may be utilized to determine that a particular amount of computational capacity for an AP should be held in reserve during these days or times to meet the increased demand for primary functionality executions that accompanies these bursts.

At 554, the method 550 may include distributing an execution of a non-primary data mining functionality among the plurality of APs based on the unutilized amount of the computational capacity at each AP of the plurality of APs. As described above, an unutilized amount of computational capacity at each access point may be determined by determining a remaining computational capacity of the network device after subtracting out the amount allocated to execute primary functionalities, and/or any amount held in reserve at the access point. The distribution may be based on the unutilized amount of computational capacity at each AP of the plurality of APs. Then, according to the distribution, a portion of the non-primary data mining functionality may be distributed to corresponding APs to be executed at the AP utilizing unused computational capacity while the AP is also executing its primary functionality. That is, the non-primary data mining functionality distributed to an AP may be executed by unused computational capacity of the AP while the AP continues to provide wireless network access to corresponding wireless clients.

At 556, the method 550 may include monitoring a wireless traffic load on each AP of the plurality of APs. The monitored wireless traffic load on each AP may be utilized to adapt the allocation of the computation resources of each AP between non-primary data mining functionality and primary functionally executions to changing traffic loads at each AP. That is the distribution of the computational resources among execution of the primary data mining functionalities and primary functionalities may not be static.

Instead, the wireless traffic load on each AP may be monitored to inform redistribution of the computational resources of each AP.

At 558, the method 550 may include redistributing the execution of the non-primary data mining functionality among the plurality of APs. The redistribution may be based on fluctuations in the monitored wireless traffic load on each AP. For example, if the monitored wireless traffic load on an AP is increased, then computational capacity may be redistributed from execution of non-primary data mining functionalities to execution of primary functionalities to satisfy the additional load imposed by the increase. Likewise, if the computational load imposed on an AP by executing non-primary data mining functionalities decreases (e.g., when an assigned portion of a data mining task is completed) then the computational capacity may be redistributed from execution of non-primary data mining functionalities to execution of primary functionalities, redistributed to execution of a second data mining task, and/or left as unused computational capacity. In some examples, the execution of the non-primary data mining functionality at an AP of the plurality of APs may be discontinued in response to an indication of an increased computational load associated with executing the primary functionality at the AP.

Further, when additional APs are added to a computing network, their integration may be detected. The computational load on the additional AP may be determined. For example, a computational resource utilization metric may be received from the additional AP. The metric may be utilized to identify unutilized computational capacity at the additional AP. The execution of the non-primary data mining functionality among the plurality of APs, including the additional AP, may be redistributed. The redistribution may be based on the detected integration and the determined computational load on the additional AP.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A system, comprising:
   a controller, communicatively connected to an access point, including:
      a processing resource; and
      a memory resource storing instructions executable by the processing resource to:
         identify an unused portion of a computational capacity of the access point when the access point is executing a primary functionality of the access point;
         allocate an amount of the unused portion of the computational capacity of the access point to execute a first portion of a non-primary data mining functionality distinct from the primary functionality of the access point, wherein execution of the first portion comprises data mining tasks on data sets unrelated to data associated with the primary functionality;
         adjust the amount of the unused portion of the computational capacity allocated to the execution of the non-primary data mining functionality based on a change in network traffic associated with the access point.

2. The system of claim 1, wherein the primary functionality of the access point is providing client devices wireless network access to the computing network.

3. The system of claim 1, wherein a primary functionality of the controller is to manage the access point.

4. The system of claim 3, the memory resource storing instructions executable to allocate an amount of an unused portion of a computational capacity of the controller when the controller is executing the primary functionality of the controller to execution of a second portion of the non-primary data mining functionality.

5. The system of claim 1, wherein the non-primary data mining functionality of the access point is assigned a lower execution priority than an execution priority of the primary functionality of the access point.

6. The system of claim 1, the memory resource storing instructions executable to cap a total amount of the computational capacity of the access point that is available to be utilized during execution of the non-primary data mining functionality.

7. The system of claim 6, the memory resource storing instructions executable to decrease the amount of the unused portion of the computational capacity of the access point allocated to the non-primary data mining functionality when the capped total amount is exceeded.

8. The system of claim 1, the memory resource storing instructions executable to reallocate the amount of the unused portion of the computational capacity of the access point, previously allocated to the execution of the non-primary data mining functionality, to the execution of the primary functionality of the access point in response to a completion of the execution of the non-primary data mining functionality.

9. The system of claim 1, the memory resource storing instructions executable to identify the unused portion of the computational capacity of the access point when the access point is executing the primary functionality of the access point based on a central processing unit (CPU) utilization measurement reported from the access point to the controller concurrent with the execution of the primary functionality by the access point.

10. The system of claim 1, the memory resource storing instructions executable to identify the amount of the unused portion of the computational capacity of the access point allocated to the execution of the first portion of the non-primary data mining functionality based on network traffic on the computing network.

11. A non-transitory machine-readable medium storing instructions executable by a processing resource to:
   identify an unused portion of a computational capacity of each access point of a plurality of access points executing a primary functionality, the primary functionality comprising providing wireless access to a computing network;

determine an amount of the unused portion of the computational capacity of each access point available to be allocated to an execution of non-primary data mining task based on computing network traffic at each of the access points, wherein the execution of the non-primary data mining task is on a data set distinct from data associated with the primary functionality; and distribute execution of the non-primary data mining task among the plurality of access points on the computing network based on the determined amount of the unused portion of the computational capacity of each access point of the plurality of access points.

12. The non-transitory machine-readable medium of claim 11, further comprising instructions executable by the processing resource to assign a reserve amount of the unused portion of the computational capacity of each access point of the plurality of access points to accommodate additional network traffic.

13. The non-transitory machine-readable medium of claim 11, further comprising instructions to redistribute the execution of the non-primary data mining functionality in response to changes in the computing network traffic utilizing at least one of the access points of the plurality of access points.

14. The non-transitory machine-readable medium of claim 11, further comprising instructions to determine the non-primary data mining task from a configuration file executed by a wireless network controller managing the plurality of access points on the computing network.

15. The non-transitory machine-readable medium of claim 11, further comprising instructions to monitor the central processing resource usage by each of the access points to identify the unused portion of the computational capacity of each access point of the plurality of access points.

16. A method, comprising:

determining an amount of a computational capacity at each access point (AP) of a plurality of APs connected to a computing network that remains unutilized in providing wireless network access to wireless clients, wherein providing wireless network assess to wireless clients comprises a primary functionality;

distributing an execution of a non-primary data mining functionality among the plurality of APs based on the unutilized amount of the computational capacity at each AP of the plurality of APs, wherein the execution of the non-primary data mining functionality is on a data set distinct from data associated with the primary functionality; and monitoring a wireless traffic load on each AP of the plurality of APs; and redistributing the execution of the non-primary data mining functionality based on the monitored wireless traffic load.

17. The method of claim 16, further comprising executing, at an AP of the plurality of APs, a portion of the non-primary data mining functionality distributed to the AP while the AP continues to provide wireless network access to corresponding wireless clients.

18. The method of claim 16, further comprising determining an amount of the unutilized computational capacity of each access point of the plurality of access points to reserve to provide additional wireless network access to wireless clients based on a schedule corresponding to historical wireless traffic loads on the computing network.

19. The method of claim 16, further comprising:

detecting an integration of an additional AP to the computing network;

determining a computational load on the additional AP; and redistributing the execution of the non-primary data mining functionality among the plurality of APs, including the additional AP, based on the detected integration and determined computational load on the additional AP.

20. The method of claim 16, further comprising discontinuing execution of the non-primary data mining functionality at an AP of the plurality of APs in response to an indication of an increased wireless traffic load at the AP.

* * * * *